United States Patent
Andrade et al.

(10) Patent No.: US 8,656,396 B2
(45) Date of Patent: Feb. 18, 2014

(54) PERFORMANCE OPTIMIZATION BASED ON THRESHOLD PERFORMANCE MEASURE BY RESUMING SUSPENDED THREADS IF PRESENT OR BY CREATING THREADS WITHIN ELASTIC AND DATA PARALLEL OPERATORS

(75) Inventors: Henrique Andrade, Hawthorne, NY (US); Bugra Gedik, Hawthorne, NY (US); Scott A. Schneider, Hawthorne, NY (US); Kun-Lung Wu, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 12/539,201

(22) Filed: Aug. 11, 2009

(65) Prior Publication Data
US 2011/0041132 A1 Feb. 17, 2011

(51) Int. Cl.
*G06F 9/46* (2006.01)
*G06F 11/00* (2006.01)

(52) U.S. Cl.
USPC .......... 718/102; 718/104; 718/105; 714/47.1; 714/47.2; 714/47.3

(58) Field of Classification Search
USPC ........................................ 718/102, 104, 105
See application file for complete search history.

(56) References Cited

U.S. PATENT DOCUMENTS

| | | | | |
|---|---|---|---|---|
| 5,600,808 A * | 2/1997 | Kasukawa | ..................... | 718/102 |
| 6,192,514 B1 * | 2/2001 | Lurndal | ....................... | 717/149 |
| 7,302,687 B2 * | 11/2007 | Austin | .......................... | 718/105 |
| 7,461,376 B2 * | 12/2008 | Geye et al. | ..................... | 718/100 |
| 7,684,332 B2 * | 3/2010 | Ray et al. | ....................... | 370/235 |
| 7,707,578 B1 * | 4/2010 | Zedlewski et al. | ............ | 718/102 |
| 7,808,918 B2 * | 10/2010 | Bugenhagen | ................. | 370/242 |
| 7,843,831 B2 * | 11/2010 | Morrill et al. | ................. | 370/235 |
| 7,917,905 B2 * | 3/2011 | Itoh | .............................. | 718/102 |
| 7,948,909 B2 * | 5/2011 | Bugenhagen et al. | ........ | 370/252 |
| 8,000,318 B2 * | 8/2011 | Wiley et al. | .................... | 370/352 |
| 8,122,455 B2 * | 2/2012 | Paul et al. | ..................... | 718/100 |
| 2002/0087611 A1 * | 7/2002 | Tanaka et al. | .................... | 709/1 |
| 2003/0126184 A1 * | 7/2003 | Austin | ......................... | 709/105 |
| 2005/0235285 A1 * | 10/2005 | Monasterio | ................... | 718/100 |
| 2006/0010101 A1 * | 1/2006 | Suzuki et al. | ..................... | 707/2 |
| 2008/0049630 A1 * | 2/2008 | Kozisek et al. | ............... | 370/250 |

OTHER PUBLICATIONS

Daniel J. Abadi, et al., "The Design of the Borealis Stream Processing Engine", Proceedings of the 2005 CIDR Conference.
Henrique Andrade, et al., "Scale-up Strategies for Processing High-Rate Data Streams in System S", pp. 1375-1378, IEEE IDCE 2009.

(Continued)

*Primary Examiner* — Abdullah Al Kawsar
*Assistant Examiner* — Abu Ghaffari
(74) *Attorney, Agent, or Firm* — F. Chau & Associates, LLC; William J. Stock

(57) ABSTRACT

A method to optimize performance of an operator on a computer system includes determining whether the system is busy, decreasing a software thread level within the operator if the system is busy, and increasing the software thread level within the operator if the system is not busy and a performance measure of the system at a current software thread level of the operator is greater than a performance measure of the system when the operator has a lower software thread level.

16 Claims, 7 Drawing Sheets

(56) References Cited

OTHER PUBLICATIONS

Matthew Curtis-Maury, et al., "Online Power-Performance Adaptation of Multithreaded Programs using Hardware Event-Based Prediction", ICS06, Jun. 28-30, Cairns, Queensland, Australia.

Bugra Gedik, et al., "SPADE: The System S Declarative Stream Processing Engine", SIGMOD '08, Jun. 9-12, 2008, Vancouver, BC, Canada.

A. Arasu, et al., "STREAM: The Stanford Stream Data Manager", Bulletin of the IEEE Computer Society Technical Committee on Data Engineering, IEEE Data Engineering Bulletin, vol. 26, 2003.

William Thies, et al., "StreamIt: A Language for Streaming Applications", Laboratory for Computer Science, Massachusetts Institute of Technology, Cambridge, MA, ICCC, Apr. 2002.

Kun-Lung Wu, et al., "Challenges and Experience in Prototyping a Multi-Modal Stream Analytic and Monitoring Application on System S", VLDB '07, Sep. 23-28, 2007, Vienna, Australia.

* cited by examiner

FIG. 6

```
int n = 0;
bool peaking = false;
ThreadList threads;
DoubleList peak;
DoubleList last;

bool less(double a,
          double b)
{
   return ((b - a) / a) >= X;
} void set(DoubleList& p,
         int n,
         double c)
{
   // New peak.
   if (c > p[n]) {
      if (less(p[n], c)) {
         // Invalidate peaks.
         for (int i = n+1;
              i < p.size();
              ++i)
         {
            p[i] = INFINITY;
         }
      }
      p[n] = c;
   }

// Decay peak rate.
   else {
      p[n] -= p[n] * Y;
   }
}
```

```
 1  double curr = calcAverageRate();
 2  set(peak, n, curr);
 3  last[n] = curr;
 4
 5  if (peaking) {
 6     if (curr < last[n+1]) {
 7        threads[n+1]->wakeup();
 8        ++n;
 9     }
10     peaking = false;
11  }
12
13  // Infer a busy system.
14  else if (less(curr, peak[n]) || (n && less(peak[n], peak[n-1]))) {
15     // Never suspend thread 0.
16     if (n != 0) {
17        threads[n]->suspend();
18        --n;
19        peaking = true;
20     }
21  }
22
23  // If we only have one active thread, or if peak performance at
24  // the level below us is significantly less than current level,
25  // then maybe we can still improve performance.
26  else if (!n || less(peak[n-1], peak[n])) {
27     // Probe higher.
28     if (n+1 == threads.size()) {
29        threads.create();
30        ++n;
31     }
32     // Only wakeup thread if it performed better.
33     else if (peak[n] < peak[n+1]) {
34        threads[n]->wakeup();
35        ++n;
36     }
37     // else, stable from above
38  }
39  // else, stable from below
```

PERFORMANCE OPTIMIZATION BASED ON THRESHOLD PERFORMANCE MEASURE BY RESUMING SUSPENDED THREADS IF PRESENT OR BY CREATING THREADS WITHIN ELASTIC AND DATA PARALLEL OPERATORS

ACKNOWLEDGEMENT

This invention was made with United States Government support under Contract No. H98230-07-C-0383, awarded by the Department of Defense. The United States Government has certain rights in this invention.

BACKGROUND

1. Technical Field

The present disclosure relates generally to distributed stream processing, and more specifically to an operator of a streaming application, which can efficiently adapt to the environment in which it is executed, and systems for executing such operators.

2. Discussion of Related Art

The availability of large-scale affordable computational infrastructure is making it possible to implement large, real-world continuous streaming data analysis applications. The implementation of continuous streaming applications where data is ingested from physical sensors (e.g., hurricane tracking stations) or consumed from business platform sources (e.g., trading information from stock exchanges), creates interesting challenges in how to develop these large-scale applications in a scalable fashion. For example it can be difficult for application developers and administrators to ensure that the processing infrastructure will cope with increased needs (e.g., adding new sensors for tracking weather changes) and variation in resource availability that happens once these long-running applications are deployed.

Additional intelligence and appropriate abstractions in the programming model supporting these applications can help. Another limitation of the current methods is that a priori traditional capacity planning techniques can be of limited use in providing guidance and system support for situations where workloads are unknown or when the runtime dynamics are not well understood. For example, in certain environments spikes in data rates need to be dealt with expeditiously at runtime (e.g., announcements by the Federal Reserve in the US usually affect trading patterns and trading transaction volumes almost immediately). Further, some of the typical streaming applications are hypothesis-driven (e.g., can I assess whether a competitor hedge fund is attempting to unload a particular asset?), which also implies spikes in processing needs.

Distributed stream processing applications currently do not include ways of adapting to runtime resource availability variations in processing cycles, memory, or I/O bandwidth. It can be difficult to design streaming applications such that its multiple components are properly placed onto the runtime environment to best utilize the computational resources. Data analysts and programmers may organize a streaming application using structured data analysis tasks. Each data analysis task may includes a logical task (e.g., how a data analysis application should be implemented in terms of fundamental building blocks) and a physical task (e.g., how the logical task should be mapped onto the physical resources). Cognitively, the logical task is much closer to analysts and developers as it is in their domain of expertise. The physical task requires deeper understanding of processor architectures, networking, and interactions of other system components. However, only very well seasoned systems developers handle the physical task, and even they are only effective when dealing with reasonably small applications.

Further, modern chips may include varying number of processing cores. Nowadays, clusters of workstations (COWs) currently deployed in most high-performance computing installations typically have from 2 to 32 cores per node. The current trend in chip design is to ramp up the number of cores to even higher numbers. However, since an application may be executed on a system with an unknown number of cores, developers cannot easily optimize streaming applications.

Thus, there is a need for methods of generating applications that can adapt to the resources of the environments to which they are executed on and systems for executing such applications.

BRIEF SUMMARY

An exemplary embodiment of the present invention includes a computing system for executing elastic operators. The elastic operators may be part of a streaming application. The system includes a plurality of computing nodes, where at least the first one of the nodes outputs a stream of data to another one of the nodes and the receiving computing node includes at least one elastic operator. The elastic operator of the receiving node is configured to dynamically adjust the number of active worker software threads within the operator based on a performance measure of the receiving node. The worker software threads are functional copies of one another and are configured to process a computing job on the received stream.

An exemplary embodiment of the present invention includes a method to optimize performance of an operator on a computer system. The method includes starting the execution of the operator on the system, the operator comprising a plurality of software threads, determining whether the system is busy, decreasing a software thread level within the operator if the system is busy, and increasing the software thread level within the operator if the system is not busy and a performance measure of the system at the current software thread level of the operator is greater than the performance measure of the system when the operator has a lower software thread level. The computer system may be interpreted to be busy when it is performing below a threshold performance level.

An exemplary embodiment of the present invention includes a method to optimize performance of an operator on a computer system. The method includes starting execution of an elastic operator on the computer system, determining whether a current performance measure of the computer system operating with the operator at a current software thread level exceeds a predefined threshold performance measure, decreasing a software thread level within the operator if the current performance measure exceeds the threshold performance measure, and increasing the software thread level within the operator if the current performance measure does not exceed the threshold performance measure.

BRIEF DESCRIPTION OF THE SEVERAL VIEWS OF THE DRAWINGS

Exemplary embodiments of the invention can be understood in more detail from the following descriptions taken in conjunction with the accompanying drawings in which:

FIG. 6 illustrates an embodiment of computer code that may be used to implement the method of FIG. 5, according to an exemplary embodiment of the present invention.

DETAILED DESCRIPTION

Figure 1:
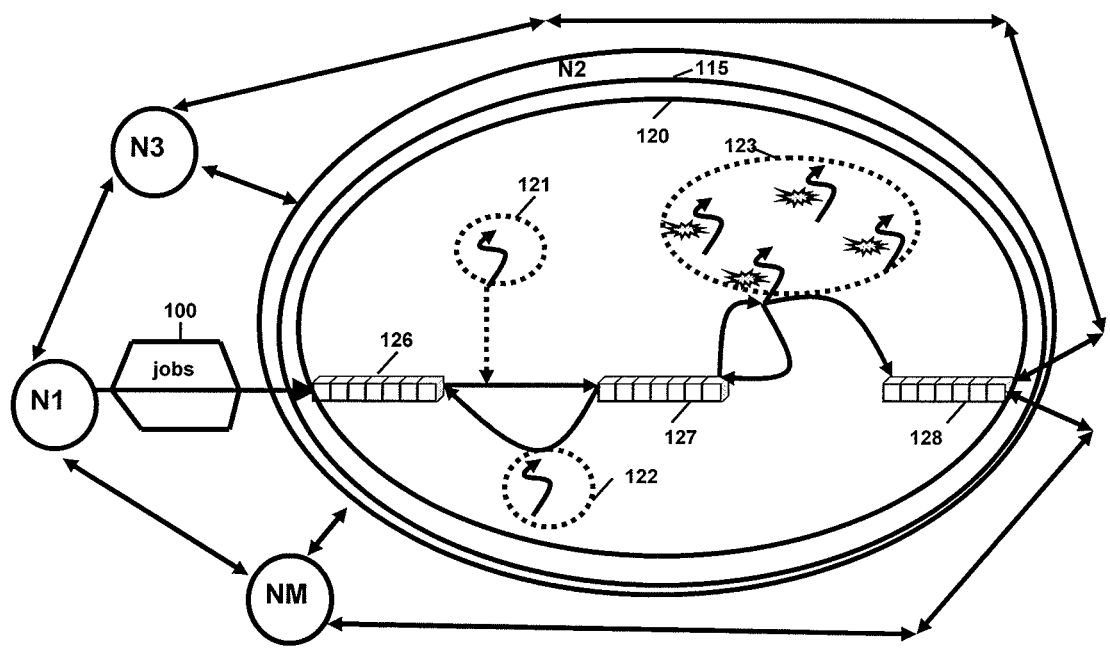
FIG. 1 illustrates a computer system that processes an elastic operator according to an exemplary embodiment of the present invention.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more computer readable medium (i.e., program storage devices such as a hard disk, magnetic floppy disk, RAM, ROM, CD ROM, etc., and executable by any device or machine comprising suitable architecture, such as a general purpose digital computer having a processor, memory, and input/output interfaces). It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the present invention will be described in the context of distributed stream processing applications. However, the system and methods described herein can work equivalently for regular distributed, component-based applications.

FIG. 1 illustrates a computer system that executes elastic operators, according to an exemplary embodiment of the present invention. The computer system includes a cluster of computing nodes N1, N2, N3, ..., NM, where M is a positive integer. While FIG. 1 illustrates a sample configuration of nodes, this is merely for ease of illustration, as the cluster may have various configurations. For example, each of the computing nodes may be interconnected with one or more of the other computing nodes.

Distributed streaming applications are run across the computing nodes. A streaming application is comprised by a plurality of operators and data streams between these operators. In our examples, one operator is executed on one computing node, but in practice, multiple operators can execute on a single computing node. For example, in FIG. 1, a data stream 100 flows from node N1 to node N2. Node N2 contains an elastic operator 120. The operator 120 includes an alarm thread 121, a dispatch software thread 122, one or more worker software threads 123, an input message queue 126, a global work queue 127, and an output message queue 128. Although not shown in FIG. 1, a data stream may be sent to other nodes (e.g., sent from N2 to N3, or sent from N2 to N1, etc.) for similar processing on the receiving node. A software thread may result from a fork of a process into two or concurrently running tasks. Each thread is contained within the process and shares the resources of the process (e.g., memory).

The worker software threads 123 are functional copies of one another. For example, assume that the operator 120 processes the purchase of stock. A different one of the worker software threads 123 may be used to process each unrelated stock transaction. The data for the elastic operator 120 are initially placed in the input message queue 126, which may be received from upstream operators (e.g., an operator of external node N1). The dispatch thread 122 manages the distribution of work. The dispatch thread 122 receives data tuples from the input message queue 126 and dispatches them into the global work queue 127. The dispatch thread 122 periodically throttles the thread level (e.g., the number of active worker software threads) within the computing node (e.g., N2) in an attempt to achieve a higher overall operating performance. The dispatch thread 122 can increase the degree of parallelism of the operator 120 by creating new worker software threads 123 or waking up sleeping ones. The dispatch thread 122 can decrease parallelism by putting existing worker threads 123 to sleep (e.g., suspending) or deleting them.

A worker thread 123 can repeatedly extract the next available tuple off of the global work queue 127 and process the extracted tuple. The worker thread 123 can place results of the processing in the output message queue 128 for output to one or more of the other nodes in the cluster (e.g., Node N3). The elastic operator 120 is parallelized by having multiple worker software threads 123, each independently processing their own tuples. Worker software threads 123 can check whether they have been told to go to sleep by the dispatch thread 122 before attempting to extract and/or process another tuple.

Figure 2:
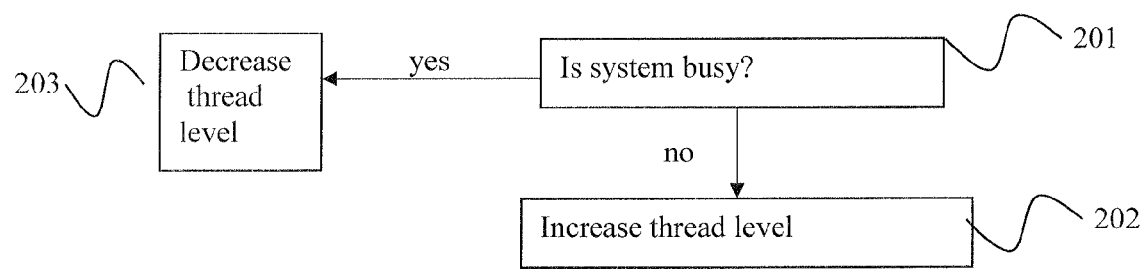
FIG. 2 illustrates a method that may be used to increase the degree of parallelism of the elastic operator of FIG. 1, according an exemplary embodiment of the present invention.

The alarm thread 121 periodically wakes up and tells the dispatch thread 122 it is time to reevaluate the thread level of the operator. When the dispatch thread 122 reevaluates the thread level, it both seeks out higher levels of parallelism, yet recognizes when increased parallelism is detrimental. FIG. 2 illustrates a method that may be used by the dispatch thread 122 to increase the degree of parallelism of operator 120 of FIG. 1, according to an exemplary embodiment of the present invention. The dispatch thread 122 determines whether a system (e.g., computing node N2) in which the thread is being executed is busy (S201). If the system is not busy, the dispatch thread 122 increases the thread level of the operator (S202). For example, the dispatch thread 122 can either create new worker threads 123 or wakeup existing worker threads that were previously suspended within the operator 120. If the computing node is busy, the dispatch thread decreases the thread level within the operator (S203). For example, the dispatch thread 122 can either delete or suspend existing worker threads 123. A system may be interpreted to be busy when it is performing below a threshold performance level.

The dispatch thread 122 can determine whether the computing node is busy by observing that the current performance of the computing node is significantly less than a previously seen peak rate at this thread level. For example, assume that four worker threads 123 have operated over the last ten intervals producing a peak performance rate of 80%. If during the next interval, the performance of the computing node drops to 70%, this could be inferred as the computing node being busy. The performance difference used to infer a busy state may be configured to be any amount, as 10% is merely an example. The performance rate of a computing node may include various performance measures such as CPU usage, memory usage, total number running processes, etc.

While software threads may be deleted and or created as necessary, the operator 120 may perform better when threads are suspended as opposed to being deleted and woken up as opposed to being created. For example, configuring the dispatch thread 122 such that it attempts to reduce the number of the worker threads 123 that need to be created or deleted may improve the overall performance of the operator 120.

Figure 3:
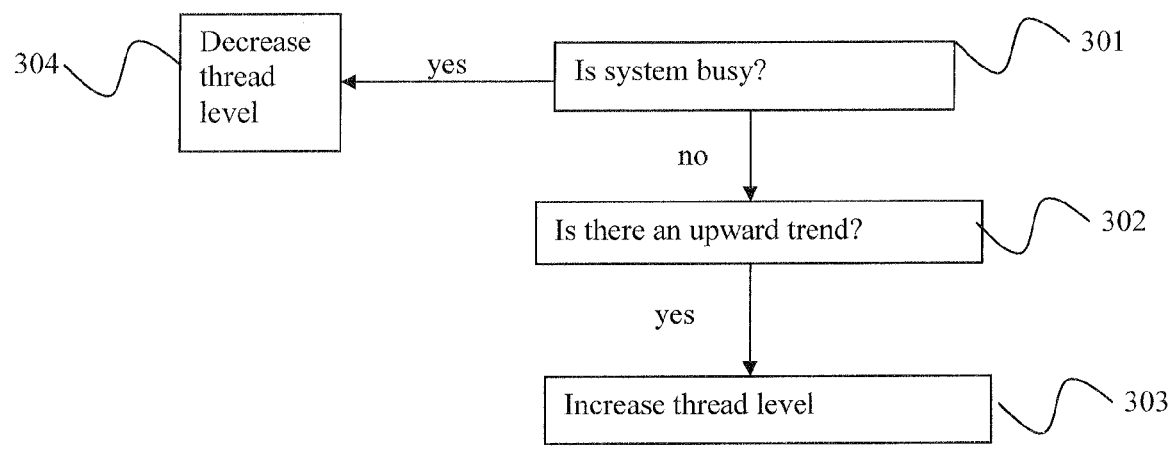
FIG. 3 illustrates another method that may be used to increase the degree of parallelism of the elastic operator of FIG. 1, according an exemplary embodiment of the present invention.

FIG. 3 illustrates another method that may be used by the dispatch thread 122 to increase the degree of parallelism of operator 120 of FIG. 1, according an exemplary embodiment of the present invention. Similar to the method of FIG. 2, the dispatch thread 122 determines whether the computing node is busy (S301). If the system is not busy, the dispatch thread 122 determines whether an upward trend is present (S302). If there is an upward trend, the dispatch thread 122 increases the thread level of the operator (S303). Like FIG. 2, if the system is not busy, the dispatch 122 decreases the thread level of the operator (S304).

An upward trend may be determined by the dispatch thread 122 by comparing the peak performances of the computing node at different thread levels. For example, assume that during the first ten intervals, the operator 120 performed with 4 worker threads and achieved a peak performance of 80%. Assume next that the operator 120 performed with 5 worker threads and achieved a peak performance of 85%. Since increasing the thread level from 4 to 5 resulted in an increase of a 5% peak performance, the dispatch thread 122 could interpret this as an upward trend. The dispatch thread 122 may be configured to look for any increase or an increase of a predefined threshold. For example, if the threshold were 4%, in this example, the dispatch thread 122 would infer an upward trend.

As discussed above, once an upward trend has been established, the dispatch thread 122 increases the thread level of the operator (e.g., one or more additional worker threads 123 are created or one or more existing worker threads 123 are woken up). Use above of ten intervals to establish a peak performance is merely an example, as a varying number of processing intervals may be used to establish a peak performance of a computing node.

Figure 4:
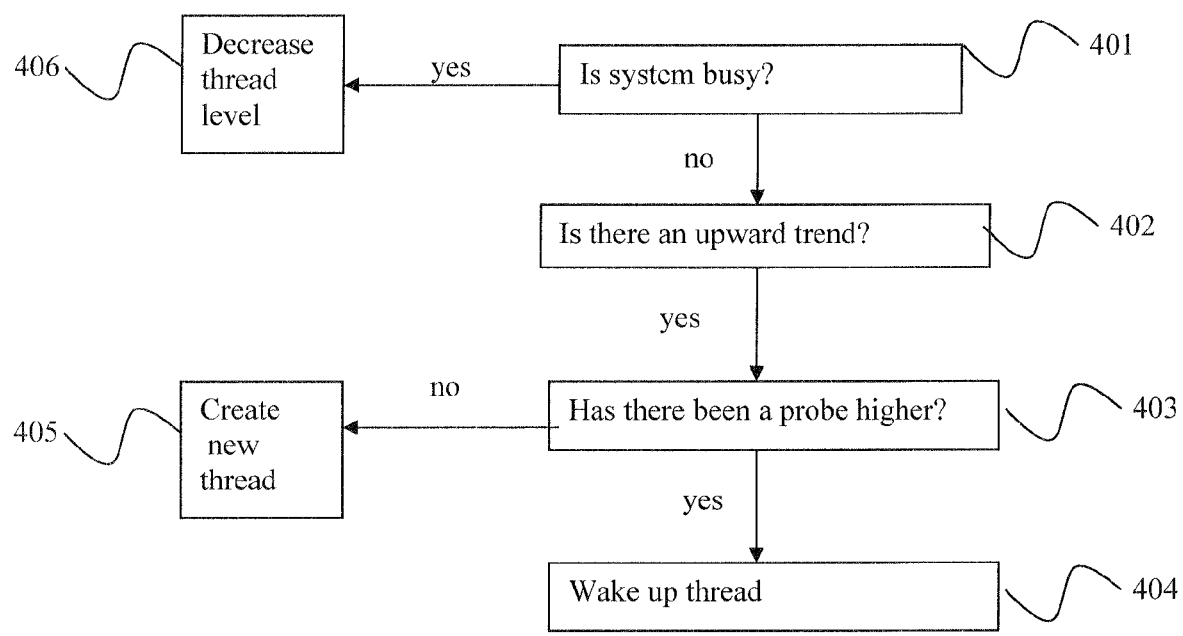
FIG. 4 illustrates another method that may be used to increase the degree of parallelism of the elastic operator of FIG. 1, according an exemplary embodiment of the present invention.

FIG. 4 illustrates another method that may be used by the dispatch thread 122 to increase the degree of parallelism of operator 120 of FIG. 1, according an exemplary embodiment of the present invention. Similar to the method of FIG. 3, the dispatch thread 122 determines whether the computing node is busy (S401) and then determines whether an upward trend is present (S402). After establishing an upward trend, the dispatch thread 122 checks whether higher thread levels have been previously probed (S403). If higher threads levels have been probed, the dispatch thread 122 wakes up an existing worker thread 123 (S404). If higher threads levels have not been probed, a new worker thread is created (S405). Like FIG. 3, if the system is busy, the dispatch 122 decreases the thread level of the operator (S406).

The dispatch thread 123 can determine if higher thread levels have been previously probed if one or more suspended worker threads 123 are present within the operator. The dispatch thread 122 can then wakeup one or more of the suspended threads. If no suspended worker threads are present, the dispatch thread creates one or more new worker threads.

Figure 5:
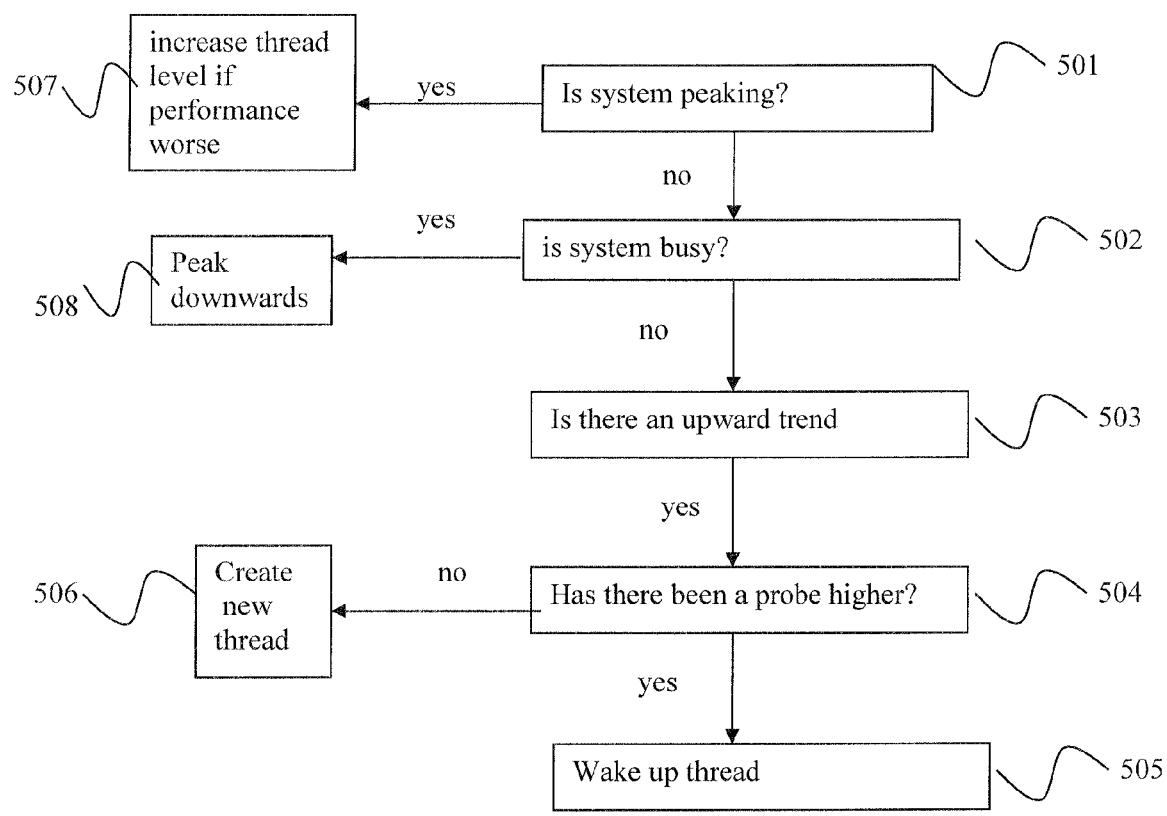
FIG. 5 illustrates another method that may be used to increase the degree of parallelism of the elastic operator of FIG. 1, according an exemplary embodiment of the present invention.

FIG. 5 illustrates another method that may be used by the dispatch thread 122 to increase the degree of parallelism of operator 120 of FIG. 1, according an exemplary embodiment of the present invention. The dispatch thread 122 determines whether a peaking condition in the computing node was previously determined (S501). For example, assume that the dispatch thread 122 had previously determined that the computing node was busy and thus decreased the thread level of the operator from 5 to 4 worker threads 123 (e.g., it suspended the 5$^{th}$ worker thread). If the current performance of the computing node under 4 worker threads 123 is worse than the last performance of the computing nodes under 5 worker threads, the dispatch node 122 increases the thread level (S507). For example, the dispatch thread 122 can go back to the last thread level, 5, in this example.

If no peaking condition is present, the method acts like FIG. 4 by determining whether the computing node is busy (S502), determining whether there is an upward trend (S503), and then determining whether there has been a probe of a higher thread level (S504). Like FIG. 4, if a higher thread level has been previously probed, a suspended thread is woken up (S505), otherwise a new thread is created (S506). If the computing node was busy, the dispatch thread 122 can move the thread level of the operator downwards (e.g., suspend one or more worker threads 123) (S508). The above check for the peaking condition takes into account that even in a busy system, decreasing the number of active worker threads 123 may harm performance.

The methods of FIGS. 2-5 allow the dispatch thread 122 to adjust the level of parallelism of the operator 120 at runtime based on measured performance, even if the workload of the application or load on the system changes.

FIG. 6 illustrates an exemplary implementation of the method of FIG. 5 as code in a computer program. While the program uses the C programming language, the logic of program may be written in various programming languages such as C++, Java, Smalltalk, etc. The variable n in FIG. 6 represents the current active thread level of an elastic operator (e.g., operator 120) on a particular computer system (e.g., computing node N2). As discussed above, in one embodiment of the present invention, threads are created, suspended, and woken up, but not necessarily destroyed. The active thread level is the number of threads (e.g., worker software threads 123) that are actively processing tuples and does not include those that are suspended. For each thread level, the program records both the peak performance rate of the computer system experienced at that level and the last experienced performance rate at that level.

The peak rates are used to detect a decline in performance of the system. Comparing peak rates across thread levels may be used to detect what the stable thread level is on a stable system with a stable workload. Comparing the current rate with the peak rate at that thread level may be used to detect when the system is no longer stable, either due to a change in workload or a change in the system. Initially, the program periodically increases the thread level as long as the peak performance increases; creating threads along the way (see e.g., lines 28-30 of FIG. 6). Once a thread level is reached at which there is no significant improvement compared to the last thread level, there is what we refer to by "stability from below" (see e.g., line 39 of FIG. 6).

If there is a performance increase when going from thread level N−1 to N, then it is likely that a performance increase will be experienced with thread level N+1. The first time this is not true, the program settles at that thread level. "Stability from below" is considered because stability can be inferred by looking at the thread levels below the current one. If the performance has not improved significantly from thread level N−1 to N, then it is likely that thread level N+1 will either harm performance or remain the same, and thus the program maintains thread level N.

The other kind of stability, "stability from above", may be achieved when the peak performance rate from thread level N−1 indicates performance is likely to improve if the thread level is increased (i.e., there exists an upward trend; see e.g., line 26 of FIG. 6), but the peak rate from thread level N+1 indicates otherwise (see e.g., line 33 of FIG. 6). This situation can occur because at some previous point, the thread level N+1 had been explored, but backed off because it harmed performance.

If an external load is placed on the system or if the workload itself changes, the measured rate may fall significantly below the peak observed performance rate (see e.g., line 14 of FIG. 6). When this happens, the program decreases the thread level in an attempt to increase system performance (see e.g., lines 16-19 of FIG. 6). Note that, even on a busy system, decreasing the thread level might harm performance. The program tries to maintain the highest possible performance for the application (e.g., the operator), but not necessarily be a fair consumer of system resources. The program may rely on fair scheduling at the operating system kernel level. The thread level is decreased and the program enters a peaking state (see e.g., line 19 of FIG. 6). The program only settles on the lower thread level if, during the next thread throttling period, the measured performance rate is better than the higher thread level (see e.g., lines 5-10 of FIG. 6). The program compares the current performance of the system at the current thread level with the last performance of the system at the next higher thread level (see e.g., line 6 of FIG. 6) in an attempt to prevent performance from gradually creeping downwards. Once pressure on the system is relieved, the program again seeks out higher thread levels that yield better performance.

The external load placed on the operator (e.g., elastic operator 120) can actually come from another elastic operator. For example, while FIG. 1 shows a single application 115 executing a single elastic operator 120, node 2 may run multiple instances of application 115, causing each operator to compete for resources on the node. However, since each operator is greedily trying to maximize its own performance, the operating system scheduling policies typically ensure that they settle into equilibrium.

There may be a conflict between maintaining stability and continually trying to improve performance by changing thread levels. Once stability is reached, either from above or from below, the thread level is not permanently fixed. For example, the fitness of a determined thread level is periodically reevaluated. While reaching stability is one of the goals, the program can react quickly to changes in the system and the workload. For these purposes, two operations are carried out on the data structure holding the observed peak rates: decay and invalidation (see e.g., line 2 of FIG. 6).

If the current performance rate is larger than the peak performance rate for a thread level, then the current performance rate becomes the peak performance rate. However, if the current rate is less than the peak rate, the peak rate may be decayed by a small percentage. This technique allows for converging on a stable thread level, which may be faster than always maintaining the peak. However, if the current rate is significantly larger than the peak rate, then the program may assume that there has been a change in either the workload or the system itself. In this case, the peak rates may be invalidated for all thread levels above the current one, which spurs renewed probing into those levels. This technique facilitates adaptation and enables recovery from an overloaded system.

The above described elastic operators may be implemented in the context of System S or INFOSPHERE STREAMS, which are stream processing platforms developed at IBM Research. The below description of System S is for illustration purposes only, so that systems and methods of the present invention can be explained in the broader context of an existing middleware. The principles, however, are applicable to any component-based distributed middleware. For example, embodiments of the present invention may be deployed, for example, in an INFOSPHERE STREAMS stream processing system, commercially available from International Business Machines Corporation of Armonk, N.Y.

System S is a large-scale, distributed data stream processing middleware. It supports structured as well as unstructured data stream processing and can be scaled to a large number of computing nodes. The System S runtime can execute a large number of long-running jobs, which may take the form of data-flow graphs. A data-flow graph includes a set of Processing Elements (PEs) connected by data streams, where each stream carries a series of tuples. The PEs are containers hosting operators that implement data stream analysis and are distributed over the computing nodes. The computing nodes are organized as a shared-nothing (only server of the cluster needs the disks at any one time) cluster of workstations (COW) or as a large supercomputer (e.g., Blue Gene®, a supercomputer from International Business Machines, Corporation). The PEs communicate with each other via their input and output ports, connected by streams. PEs can be explicitly connected using name-based static stream subscriptions that are resolved at compile-time or through dynamic expression-based subscriptions that are established at runtime, upon the availability of streams that match the subscription expression.

SPADE is a language and a compiler for creating distributed data stream processing applications to be deployed on System S. Embodiments of this invention may employ the SPADE programming language. SPADE stands for "Stream Processing Application Declarative Engine," a programming language and compilation infrastructure specifically built for streaming systems. The SPADE programming language is a high-level programming language (i.e., a programming language that does not reflect the structure of any particular computer or operating system) that is used to implement stream processing applications. The SPADE programming model is more fully described by Gedik et al. in "SPADE: The System S Declarative Stream Processing Engine," SIGMOD Conference 2008: 1123-1134."

SPADE offers: (1) a language for flexible composition of parallel and distributed data-flow graphs; (2) a toolkit of type-generic built-in stream processing operators, which include all basic stream-relational operators, as well as a number of plumbing operators (such as stream splitting, demultiplexing, etc.); (3) an extensible operator framework, which supports the addition of new type generic and configurable operators (UBOPs) to the language, as well as new user-defined non-generic operators (UDOPs) used to wrap existing, possibly legacy analytics; (4) a broad range of edge adapters used to ingest data from outside sources and publish data to outside destinations, such as network sockets, databases, file systems, etc.

The SPADE language provides a stream-centric, operator-based programming model. The stream-centric design implies a programming language where the basic building block is a stream. In other words, an application writer can quickly translate the flows of data she anticipates from a block diagram prototype into the application skeleton, by simply listing the stream data flows.

Operator-based programming is focused on designing the application by reasoning about the smallest possible building blocks needed to deliver the computation an application is supposed to perform. The SPADE operators are organized in terms of domain specific toolkits (e.g., signal processing, data mining, etc). The SPADE compiler can be modified to generate the code (e.g., see code of FIG. 6) that makes the above described elastic operator 120, when it deems that such an approach is advantageous.

Given an application source code in the SPADE language, the SPADE compiler generates specialized application code based on the computation and communication capabilities of the runtime environment. This specialization might include (1) code fusion, that is, the ability to translate the logical description of an application in terms of operators into a set of processing elements (PEs) such that multiple operators may be placed inside a single processing element and the streams between them are converted into function calls; (2) vectorization where operations expressed in terms of vectors (note that vectors are basic types in SPADE) are translated into code that employs SIMD instructions using SSE or AltiVec instruction sets; and (3) profiling where performance data collection employs the different mechanisms provided by a particular CPU (i.e., hardware counters) for obtaining metrics, which are later used for optimizing the placement of operators on processing elements.

The SPADE compiler may be modified to generate specialized code that makes use of the above described elastic operators. For example, operators declared as "elastic" may be placed in a container that can dynamically adjust its processing level as a function of available cycles and incoming workload. Regular SPADE operators perform their computations sequentially. As tuples arrive, they are processed by a single flow of control. When the SPADE operators are made elastic, they can perform their computations in parallel, while also dynamically adapting the level of parallelism to obtain the best performance on a particular node, which can in turn make intelligent use of additional cores that might be available, according to teachings of the invention.

This approach, which may be referred to as operator elasticity, applies to operators that are amenable to data parallelism. In particular, operator elasticity may work well with operators that are pure functions and those that maintain no state in between processing different tuples. Stateful operators that are thread-safe can also work within in this framework.

Figure 7:
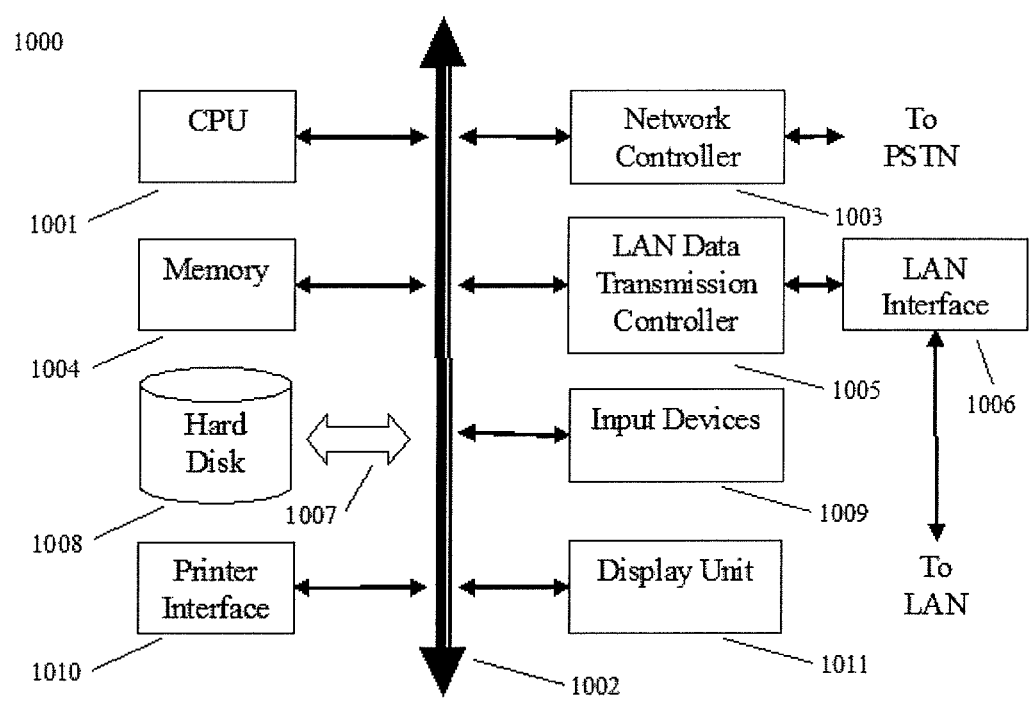
FIG. 7 shows an example of a computer system capable of implementing the methods and systems according to embodiments of the present invention.

FIG. 7 illustrates an example a computer system that may be used to implement the above described computer system (e.g., any or all of computing nodes N1-NM), which can implement the methods of the present disclosure. The methods of the present disclosure may be implemented in the form of a software application (e.g., using SPADE) running on the computer system, for example, a mainframe, personal computer (PC), handheld computer, server, etc. The software application may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008, via a link 1007. CPU 1001 may be the computer processor that performs the steps of the methods described above with reference to FIG. 2-6.

The above described data computing jobs and elastic operators, which may be output from and received by the computer system, for example through LAN interface 1006 and results associated with the processing of the jobs by the elastic and other operators may be output through printer interface 1010, or displayed on display unit 1011.

It is to be understood that exemplary embodiments disclosed above are illustrative only, as the invention may be modified and practiced in different but equivalent manners apparent to those skilled in the art having the benefit of the teachings herein. It is therefore evident that exemplary embodiments disclosed herein may be altered or modified and all such variations are considered within the scope and spirit of the invention.

What is claimed is:

1. A method to optimize performance of a computer system executing an operator, the method comprising:
   starting, by a processor, the execution of the operator on the computer system, wherein the operator is a computer process comprising at least one software thread;
   determining, by the operator, whether a first performance measure is below a threshold performance measure, the first performance measure being a measure of the computer system executing the operator having a first software thread level;
   decreasing, by the operator, the first software thread level within the operator if the first performance measure is below the threshold performance measure; and
   increasing, by the operator, the first software thread level within the operator if the first performance measure is not below the threshold performance measure and the first performance measure is greater than a second performance measure, the second performance measure being a measure of the computer system executing the operator having a second software thread level lower than the first software thread level,
   wherein the software thread level within the operator indicates the number of active software threads within the operator for processing a same type of computing job,
   wherein increasing the first software thread level comprises:
      determining whether a suspended thread within the operator is present;
      waking up the suspended thread if the suspended thread is determined to be present; and
      creating a new thread within the operator if the suspended thread is determined not to be present.

2. The method of claim 1, wherein the determining, by the operator, whether the first performance measure is below the threshold performance measure comprises determining whether the first performance measure is less than a peak performance measure of the system executing the operator having the first software thread level,
   wherein the peak performance measure is a highest measure among a group of prior recorded performance measures of the system executing the operator having the first software thread level.

3. The method of claim 1, wherein the determining, by the operator, whether the first performance measure is below the threshold performance measure comprises determining whether a first peak performance measure of the system executing the operator having the first software thread level is less than a second peak performance measure of the system executing the operator having the second software thread level,
   wherein the first peak performance measure is a highest measure among a group of prior recorded performance measures of the system executing the operator having the first software thread level, and
   wherein the second peak performance measure is a highest measure among a group of prior recorded performance measures of the system executing the operator having the second software thread level.

4. The method of claim 1, wherein the second performance measure is a highest value among a plurality of previous performance measures of the computer system executing the operator having the second software thread level.

5. The method of claim 1, further comprising:
- examining a current performance measure of the system executing the operator having a given software thread level;
- comparing the current performance measure to a peak performance measure of the system executing the operator having the given software thread level; and
- decaying the peak performance measure by a predefined percentage if the current performance measure is lower than the peak performance,
- wherein the peak performance measure is a highest measure among a group of prior recorded performance measures of the system executing the operator having the given software thread level.

6. The method of claim 1, wherein decreasing the first software thread level comprises suspending a software thread within the operator.

7. The method of claim 1, wherein before determining whether the first performance measure is below the threshold performance measure, the method comprises increasing a software thread level within the operator if a current performance measure of the system is lower than a performance measure of the system executing the operator having a higher software thread level and a software thread included within the operator is currently suspended.

8. A computing system comprising:
- a plurality of computing nodes, wherein each computing node is a distinct computer;
- wherein a node of the computing nodes is configured to output a stream of data to another first node of the computing nodes,
- wherein an elastic operator on the first node is configured to increase the number of its active worker software threads within the operator if a first performance measure of the first node executing the operator having a first software thread level is greater than a threshold performance measure and the first performance measure is greater than a second performance measure of the first node executing the operator having a second software thread level lower than the first software thread level,
- wherein the worker software threads are functional copies of one another and are configured to process a tuple within the received stream, and
- wherein the elastic operator is a computer process,
- wherein the elastic operator increases the number of its active worker software threads by determining whether a suspended thread within the operator is present, waking up the suspended thread if the suspended thread is determined to be present, and creating a new thread within the operator if the suspended thread is determined not to be present.

9. The computing system of claim 8, wherein the elastic operator further comprises:
- a dispatch queue configured to receive tuples of the stream;
- a dispatch software thread configured to dispatch the streamed tuples to the dispatch queue; and
- an alarm thread that periodically wakes up the dispatch software thread.

10. The computing system of claim 9, wherein the elastic operator decreases the number of worker software threads within the elastic operator when the first performance measure is less than the second performance measure.

11. The computing system of claim 9, wherein the elastic operator determines that the first performance measure of the first node is below the threshold performance measure when the first performance measure is less than a peak performance measure of the first node executing the elastic operator including the first number of active worker software threads, wherein the peak performance measure is a highest measure among a group of prior recorded performance measures of the system executing the operator including the first number of active work software threads.

12. The computing system of claim 8, wherein the nodes are organized as a share-nothing cluster of workstations.

13. The computing system of claim 8, wherein the first node includes a plurality of processing cores.

14. The computing system of claim 13, wherein the worker threads are configured to be executed simultaneously by at least two of the processing cores.

15. A computer program product for optimizing performance of a computer system executing an operator, the computer program product comprising:
- a non-transitory computer readable storage medium having computer readable program code embodied therewith, the computer readable program code comprising:
- computer readable program code configured to:
- determine whether a first performance measure is below a threshold performance measure, the first performance measure being a measure of the computer system executing the operator having a first software thread level,
- decrease the first software thread level within the operator if the first performance measure is below the threshold performance measure,
- increase the first software thread level within the operator if the first performance measure is not below the threshold performance measure and the first performance measure is greater than a second performance measure, the second performance measure being a measure of the computer system executing the operator having a lower prior software thread level,
- wherein the software thread level within the operator indicates the number of active software threads within the operator for processing a same type of computing job,
- wherein the increase of the first software thread level is performed by:
- determining whether a suspended thread within the operator is present;
- waking up the suspended thread if the suspended thread is determined to be present; and
- creating a new thread within the operator if the suspended thread is determined not to be present.

16. A method to optimize performance of a computer system executing an operator, the method comprising:
- starting, by a processor, the execution of the operator on the computer system, wherein the operator is a computer process comprising at least one software thread;
- determining, by the operator, whether a first performance measure is below a threshold performance measure, the first performance measuring being a measure of the computer system executing the operator having a first software thread level; and
- increasing, by the operator, the first software thread level within the operator if the first performance measure is not below the threshold performance measure and the first performance measure is greater than a second performance measure, the second performance measure being a measure of the computer system executing the operator having a lower prior software thread level,
- wherein the software thread level within the operator indicates the number of active software threads within the operator for processing a same type of computing job,
- wherein increasing the first software thread level comprises:

determining whether a suspended thread within the operator is present;
waking up the suspended thread if the suspended thread is determined to be present; and
creating a new thread within the operator if the suspended thread is determined not to be present.

* * * * *